(12) United States Patent
Bheda

(10) Patent No.: US 10,538,035 B2
(45) Date of Patent: Jan. 21, 2020

(54) CONSUMABLE SCAFFOLD FOR 3D PRINTING OF HIGH-TENSILE-STRENGTH MATERIALS

(71) Applicant: Arevo, Inc., Santa Clara, CA (US)

(72) Inventor: Hemant Bheda, Saratoga, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

(21) Appl. No.: 15/836,841

(22) Filed: Dec. 9, 2017

(65) Prior Publication Data
US 2019/0176406 A1 Jun. 13, 2019

(51) Int. Cl.
| B29C 64/40 | (2017.01) |
| B29C 64/118 | (2017.01) |
| B33Y 40/00 | (2015.01) |
| B33Y 80/00 | (2015.01) |
| B33Y 30/00 | (2015.01) |
| B33Y 10/00 | (2015.01) |

(52) U.S. Cl.
CPC .............. B29C 64/40 (2017.08); B33Y 40/00 (2014.12); B33Y 80/00 (2014.12); *B29C 64/118* (2017.08); *B33Y 10/00* (2014.12); *B33Y 30/00* (2014.12)

(58) Field of Classification Search
CPC ..... B29C 64/40; B29C 64/118; B29C 64/245; B29C 64/141
See application file for complete search history.

(56) References Cited

U.S. PATENT DOCUMENTS

| 9,126,365 | B1 * | 9/2015 | Mark | B29C 70/20 |
| 9,833,944 | B1 | 12/2017 | Huthmaker | |
| 2008/0170112 | A1 * | 7/2008 | Hull | B29C 64/124 347/127 |
| 2014/0300017 | A1 * | 10/2014 | Wighton | B29C 67/0092 264/40.1 |
| 2015/0054193 | A1 * | 2/2015 | Meyer | B29C 67/0092 264/219 |
| 2015/0137423 | A1 * | 5/2015 | Ding | B29C 67/0092 264/308 |
| 2015/0360421 | A1 * | 12/2015 | Burhop | G05B 19/4099 264/401 |
| 2016/0145455 | A1 * | 5/2016 | Otake | C08B 3/10 106/200.2 |
| 2017/0036400 | A1 | 2/2017 | Loeffler et al. | |
| 2017/0190120 | A1 | 7/2017 | Bloome et al. | |
| 2018/0036946 | A1 * | 2/2018 | Barton | B29C 64/165 |
| 2018/0194079 | A1 * | 7/2018 | Hardee | B33Y 10/00 |

FOREIGN PATENT DOCUMENTS

WO WO-2017180958 A2 * 10/2017 ............. A43B 7/141

* cited by examiner

*Primary Examiner* — William P Bell
(74) *Attorney, Agent, or Firm* — McGeary Cukor LLC; Jason Paul DeMont; Kenneth Ottesen

(57) ABSTRACT

A consumable scaffold and technique for supporting an object while it is being manufactured is disclosed. The consumable scaffold comprises a base sheet and an array of pillars that are cantilevered from one side of the sheet. The consumable scaffold resembles a bed of nails. Each pillar in the array of pillars is trimmed to a desired length and the object is manufactured by fusing thermoplastic filaments to the tips of the pillars.

18 Claims, 20 Drawing Sheets

Consumable Scaffold 1000 - Cruciate Pillars with Concave Obverse Side and Concave Pillar Contour at Cross-Section C-C (Pre-Trimming)
(Orthographic View at Cross-Section C-C)

Distal End of Cylindrical Pillar (Before Trimming)
(Orthograpghic Top View)

Distal End of Cylindrical Pillar (After Trimming) - Frustum of a Cone
(Orthograpghic Top View)

Distal End of Cylindrical Pillar (Before Trimming)
(Orthograpghic Front View)

Distal End of Cylindrical Pillar (After Trimming) - Frustum of a Cone
(Orthograpghic Front View)

Distal End of Cruciate Pillar (After Trimming) - Frustum of a Conic Cruciate (Orthographic Top View)

Distal End of Cruciate Pillar (After Trimming) - Frustum of a Conic Cruciate (Orthographic Front View)

Distal End of Cruciate Pillar (Before Trimming) (Orthographic Top View)

Distal End of Cruciate Pillar (Before Trimming) (Orthographic Front View)

Distal End of I-Beam Pillar (Before Trimming) (Orthogragphic Top View)

Distal End of I-Beam Pillar (Before Trimming) (Orthogragphic Front View)

Distal End of I-Beam Pillar (After Trimming) - Frustum of a Conic I-Beam (Orthogragphic Top View)

Distal End of I-Beam Pillar (After Trimming) - Frustum of a Conic I-Beam (Orthogragphic Front View)

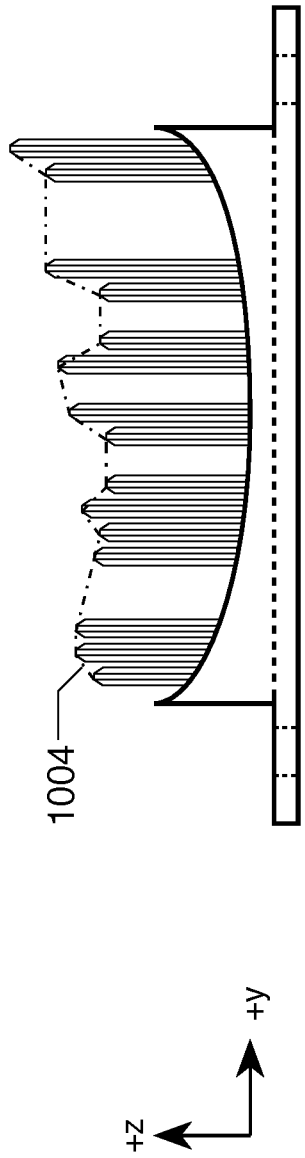
Figure 10e — Consumable Scaffold 1000 - Cruciate Pillars with Concave Obverse Side at Cross-Section D-D (Post-Trimming) (Orthographic View at Cross-Section D-D)

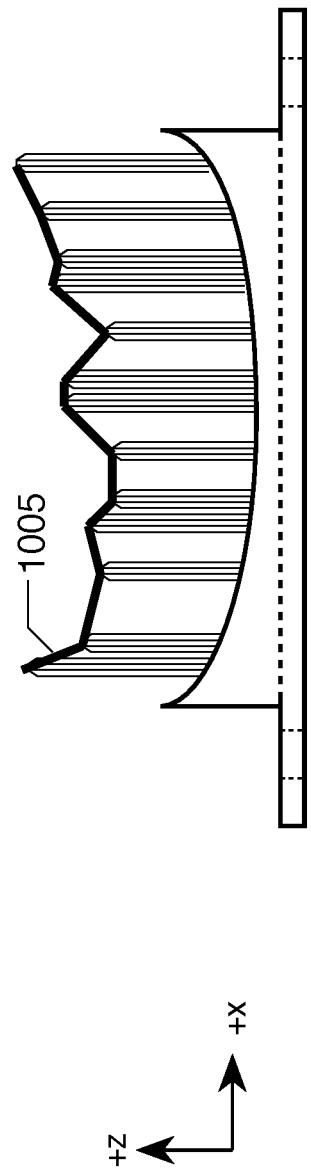
Figure 10f. Consumable Scaffold 1000 - Cruciate Pillars with Concave Obverse Side at Cross-Section C-C (Post-Trimming) with Fused Filament (Orthographic View at Cross-Section C-C)

Consumable Scaffold 1100 - Cruciate Pillars with Convex Obverse Side and Convex Pillar Contour at Cross-Section E-E (Pre-Trimming) (Orthographic View at Cross-Section E-E)

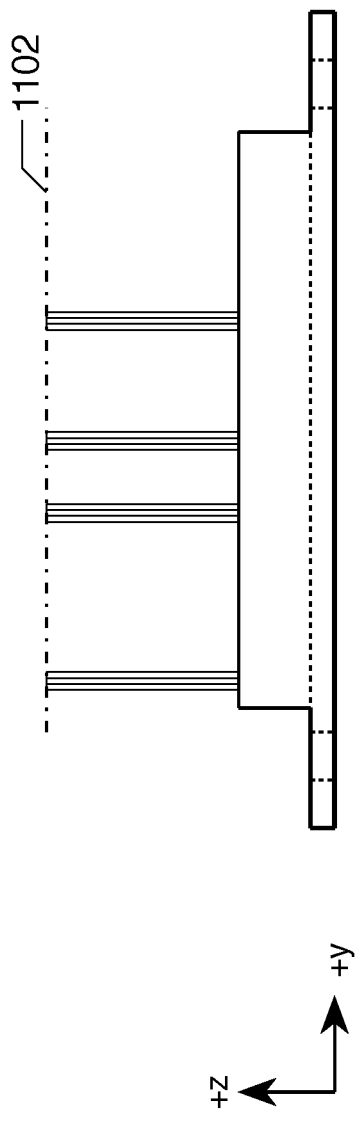
Figure 11c. Consumable Scaffold 1100 - Cruciate Pillars with Planar Obverse Side and Planar Pillar Contour at Cross-Section F-F (Pre-Trimming) (Orthographic View at Cross-Section F-F)

Consumable Scaffold 1100 - Cruciate Pillars with Convex Obverse Side at Cross-Section E-E (Post-Trimming) with Fused Filament (Orthographic View at Cross-Section E-E)

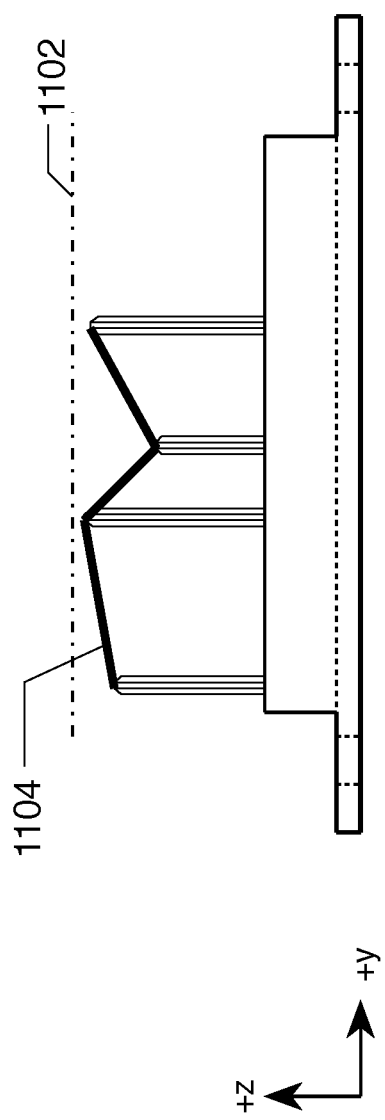
Figure 11e   Consumable Scaffold 1100 - Cruciate Pillars with Planar Obverse Side at Cross-Section F-F (Post-Trimming) with Fused Filament (Orthographic View at Cross-Section F-F)

CONSUMABLE SCAFFOLD FOR 3D PRINTING OF HIGH-TENSILE-STRENGTH MATERIALS

REFERENCE TO RELATED APPLICATIONS

The following are incorporated by reference:
(i) U.S. patent application Ser. No. 15/827,721, filed Nov. 30, 2017, entitled "Filament Guide," and
(ii) U.S. patent application Ser. No. 15/827,711, filed Nov. 30, 2017, entitled "Filament Heating in 3D Printers."

FIELD OF THE INVENTION

The present invention relates to 3D printing, in general, and, more particularly, to a technique for supporting objects while they are being manufactured.

BACKGROUND OF THE INVENTION

In general, there are two complementary approaches to manufacture an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "3D printing"—is the subject of intense research and development because it enables objects with complex geometries to be manufactured without molds or dies. Furthermore, 3D printing enables the mass customization of objects with different dimensions and characteristics. There remain, however, many challenges in the design, manufacture, and use of 3D printers.

SUMMARY OF THE INVENTION

When some 3D printers manufacture an object on a build plate, the cured and solidified object can adhere to the build plate with such force that it is difficult to detach without damaging it. In accordance with some 3D printing processes, adhesion between the molten material being deposited and the build plate is unnecessary and disadvantageous, and in those cases the adhesion problem is addressable by applying a non-stick surface (e.g., polytetrafluoroethylene, etc.) to the build plate. In some alternative 3D printing processes, however, adhesion between the molten material and the build plate is advantageous, and, therefore, applying a non-stick surface to the build plate is disadvantageous.

For example, the illustrative embodiment of the present invention manufactures objects by depositing segments of fiber-reinforced thermoplastic filament. This filament has a high-tensile strength, and straight segments of filament are deposited under tension. In order to deposit the filament under tension, the filament must be subject to two diametrically-opposed forces. One of the forces—analogous to a thrust force—is provided by the 3D printer's deposition head as it pulls the filament as it is fused. The second force—a drag force—is provided by the build plate through adhesion. Therefore, if there is no adhesion between the build plate and the molten filament, there is no opposing drag force and the filament cannot be deposited under tension. One solution to this problem might be to coat the build plate in a material that adheres to molten thermoplastic but that does not adhere to cured and solidified thermoplastic. The inventor is not aware of the existence of such a material.

In contrast, the illustrative embodiment addresses these issues by depositing the molten filaments onto a consumable scaffold—which is mechanically attached to the build plate—rather than directly onto the build plate. This technique exhibits several advantages:

(1) the geometry and material composition of the consumable scaffold is tailored to provide exactly the desired rigidity and adhesion for depositing the molten filament, and
(2) the consumable scaffold is easily attached and detached from the build plate, and
(3) the surface area where the consumable scaffold is fused to the object is isolated to the relatively-small spatially-separated distal ends of the pillars, and, therefore, the consumable scaffold is easily detached from the manufactured object without damaging the object, and
(4) the consumable scaffold can provide support for objects that lack a planar surface or set of coplanar exterior points, which would, in the prior art, rest on the build plate, and
(5) the geometry of the consumable scaffold can be tailored to support objects with complex surface geometries.

In accordance with the illustrative embodiment, a consumable scaffold is fabricated that comprises a base sheet and an array of pillars that are cantilevered from one side of the base sheet, as depicted in FIG. 3a.

In accordance with the illustrative embodiment, the consumable scaffold is made of the same thermoplastic as that in the filament and the consumable scaffold is fabricated using injection molding to keep its cost down. It will be clear to those skilled in the art, after reading this disclosure, how to make and use alternative embodiments of the present invention in which the consumable scaffold is made of a different but compatible thermoplastic as the filament.

In accordance with the illustrative embodiment, the consumable scaffold comprises apertures (i.e., holes) to enable it to be bolted to, and unbolted from, the build plate.

In accordance with the illustrative embodiment, each pillar in the array of pillars is individually trimmed (i.e., shortened) to provide a support with a geometry that is customized for the object to be manufactured.

In accordance with the illustrative embodiment, one or more segments of filament are fused to the distal ends (i.e., tips) of the pillars to form the "underside" of the object to be manufactured.

After the deposition of segments of filaments is complete, the consumable scaffold and the object—which are fused together at the distal ends of the pillars—are mechanically removed from the build plate. The consumable scaffold is then severed from the object by cutting the distal ends of the pillars away from the object. The consumable scaffold is then discarded or recycled.

The illustrative embodiment of the present invention comprises:
injecting a mass of molten thermoplastic into a mold to form a consumable scaffold that comprises:
(i) a base sheet that comprises an obverse side and a reverse side, and
(ii) a first pillar that is cantilevered from the obverse side of the base sheet, wherein the first pillar comprises a proximal end at the obverse side of the base sheet and a distal end, and (iii) a second pillar that is cantilevered from the obverse side of the base sheet, wherein the second pillar comprises a proximal end at the obverse side of the base sheet and a distal end;

trimming the distal end of the first pillar;

heating the distal end of the first pillar and a first part of a fiber-reinforced thermoplastic filament and fusing the first part of the fiber-reinforced thermoplastic filament to the distal end of the first pillar; and heating the distal end of the second pillar and a second part of the fiber-reinforced thermoplastic filament and fusing the second part of the fiber-reinforced thermoplastic filament to the distal end of the second pillar.

BRIEF DESCRIPTION OF THE DRAWINGS

FIG. 10e depicts an orthographic side view of consumable scaffold 1000 at cross-section D-D, which depicts a concave obverse side and a post-trimming pillar contour that conforms to workpiece contour 1004.

FIG. 10f depicts an orthographic front view of consumable scaffold 1000 at cross-section C-C, which depicts a concave obverse side and filament 1005, which has been fused to the distal ends of the post-trimmed pillars in conformance with workpiece contour 1003.

FIG. 11c depicts an orthographic side view of consumable scaffold 1100 at cross-section F-F, which depicts a planar obverse side and a planar pre-trimming pillar contour.

FIG. 11e depicts an orthographic front view of consumable scaffold 1100 at cross-section F-F, which depicts filament 1004, which has been fused to the distal ends of the post-trimmed pillars.

DETAILED DESCRIPTION OF THE INVENTION

Figure 1:
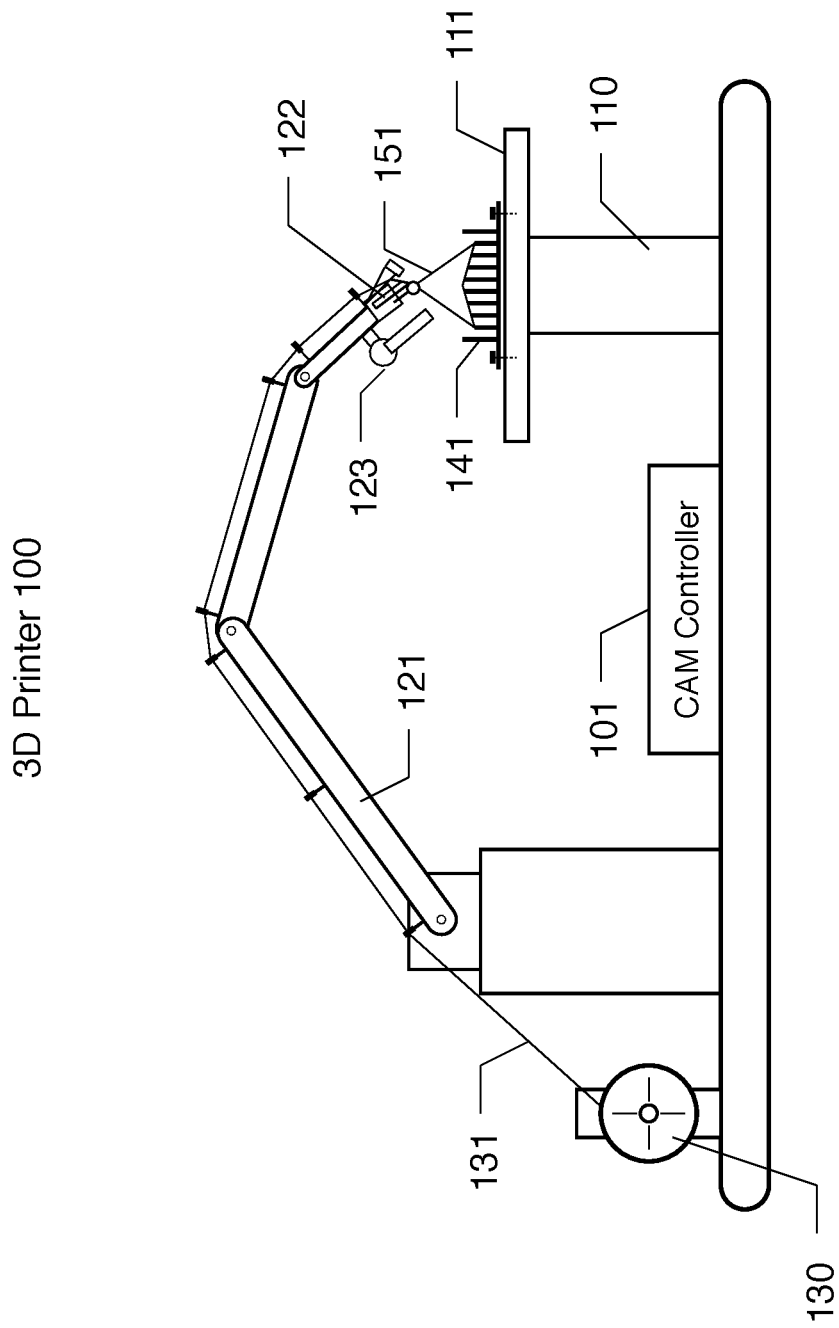
FIG. 1 depicts an illustration of the salient components of 3D printer 100 in accordance with the illustrative embodiment of the present invention.

FIG. 1 depicts an illustration of the salient components of 3D printer 100 in accordance with the illustrative embodiment of the present invention. 3D printer 100 comprises: CAM controller 101, rotatable scaffold 110, build plate 111, robotic arm 121, deposition head 122, cylindrical sharpener 123, spool 130, filament 131, and consumable scaffold 141. The purpose of 3D printer 100 is to manufacture object 151.

CAM controller 101 comprises the hardware and software necessary to direct robotic arm 121, deposition head 122, cylindrical sharpener 123, and rotatable scaffold 110 to manufacture object 151 on consumable scaffold 141. It will be clear to those skilled in the art, after reading this disclosure, how to make and use CAM controller 101.

Rotatable scaffold 110 comprises a stepper motor that is capable of rotating build plate 111 (and, consequently consumable scaffold 141 and object 151) around the Z-axis. In particular, rotatable scaffold 110 is capable of:

i. rotating build plate 111 clockwise around the Z-axis from any angle to any angle, and ii. rotating build plate 111 counter-clockwise around the Z-axis from any angle to any angle, and iii. rotating build plate 111 at any rate, and iv. maintaining (statically) the position of build plate 111 at any angle.

It will be clear to those skilled in the art how to make and use rotatable scaffold 110.

Build plate 111 provides the structural support for consumable scaffold 141. In accordance with the illustrative embodiment, build plate comprises threaded holes that correspond to the apertures in consumable scaffold 141 and that enable consumable scaffold 141 to be bolted (i.e., mechanically affixed) to build plate 111. Furthermore, build plate 111 comprises a non-stick finish (e.g., polytetrafluoroethylene, which is also known as Teflon®, Silverstone®, etc.) that is phobic to the material constituting consumable scaffold 141 to ensure that consumable scaffold 141 does not adhere to build plate 111. It will be clear to those skilled in the art, after reading this disclosure, how to make and use alternative embodiments of the present invention in which consumable scaffold 141 is mechanically affixed to build plate 111 with another means (e.g., clamps, vacuum, etc.).

Robotic arm 121 is a seven-axis robot capable of placing deposition head 122 and cylindrical sharpener 123 at any location in the build volume of object 151 and from any approach angle. Furthermore, robotic arm can move deposition head 122 through any path in:
 i. the +X direction,
 ii. the −X direction,
 iii. the +Y direction,
 iv. the −Y direction,
 v. the +Z direction,
 vi. the −Z direction, and
 vii. any combination of i, ii, iii, iv, v, and vi
to deposit filament 131. It will be clear to those skilled in the art how to make and use robotic arm 121.

Deposition head 122 is hardware that heats portions of segments of filament 131 and whatever that portion is to be fused to (e.g., the distal end of a pillar on consumable scaffold 141, another portion of another segment of filament 131, another portion of the same segment of filament 131, etc.) and presses the heated portion of the segment of filament 131 into its final position. Details of deposition head 122 are described in co-pending U.S. patent application Ser. No. 15/827,711 entitled "Filament Heating in 3D Printers," and U.S. patent application Ser. No. 15/827,721 entitled "Filament Guide."

Cylindrical sharpener 123 is a cylindrical planetary sharpener that is capable of trimming the distal end of each pillar on consumable scaffold 141 to any desired length. In accordance with the illustrative embodiment, cylindrical sharpener 123 sharpens the distal end of the pillar into the frustum of a cone—and not into a pure (i.e., "pointed") cone so as to preserve the lateral strength of the distal end.

In accordance with the illustrative embodiment, cylindrical sharpener is retractably mounted on robotic arm 121 so that it can be used for trimming the pillars of consumable scaffold 141 but retracted when deposition head 122 is depositing filament 131. It will be clear to those skilled in the art how to make and use cylindrical sharpener 123.

Filament 131 is a fiber-reinforced thermoplastic filament that comprises a cylindrical towpreg of continuous 12K carbon fiber. It will be clear to those skilled in the art, after reading this disclosure, how to make and use alternative embodiments of the present invention in which filament 131 comprises a different number of fibers (e.g., 1K, 3K, 6K, 24K, etc.).

It will be clear to those skilled in the art, after reading this disclosure, how to make and use alternative embodiments of the present invention in which filament 131 comprises chopped fibers. Furthermore, it will be clear to those skilled in the art, after reading this disclosure, how to make and use alternative embodiments of the present invention in which the filament comprises a combination of continuous and chopped fibers. It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiment, the thermoplastic is, in general, a semi-crystalline polymer and, in particular, the polyaryletherketone (PAEK) known as polyetherketone (PEK). It will be clear to those skilled in the art how to make and use alternative embodiments of the present invention in which the thermoplastic is the semi-crystalline material polyaryletherketone (PAEK), polyetheretherketone (PEEK), polyetherketoneketone (PEKK), polyetheretherketoneketone (PEEKK), or polyetherketoneetherketoneketone (PEKEKK).

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC).

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed object.

In some alternative embodiment of the present invention, the filament is reinforced with meta (e.g., stainless steel, inconel, titanium, aluminum, cobalt chrome, copper, bronze, iron, platinum, gold, silver, etc.).

Consumable scaffold 141 is an article of manufacture that is used once—in the manufacture of object 151—and is discarded. Consumable scaffold 141 is described in detail below and in the accompanying figures.

Object 151 is an object of arbitrary geometry and size that is made from one or more fused segments of filament 131. It will be clear to those skilled in the art how to generate a mathematical model of object 151 and how to generate a series of instructions for directing 3D printer 100 to manufacture object 151 on top of consumable scaffold 141.

Figure 2:
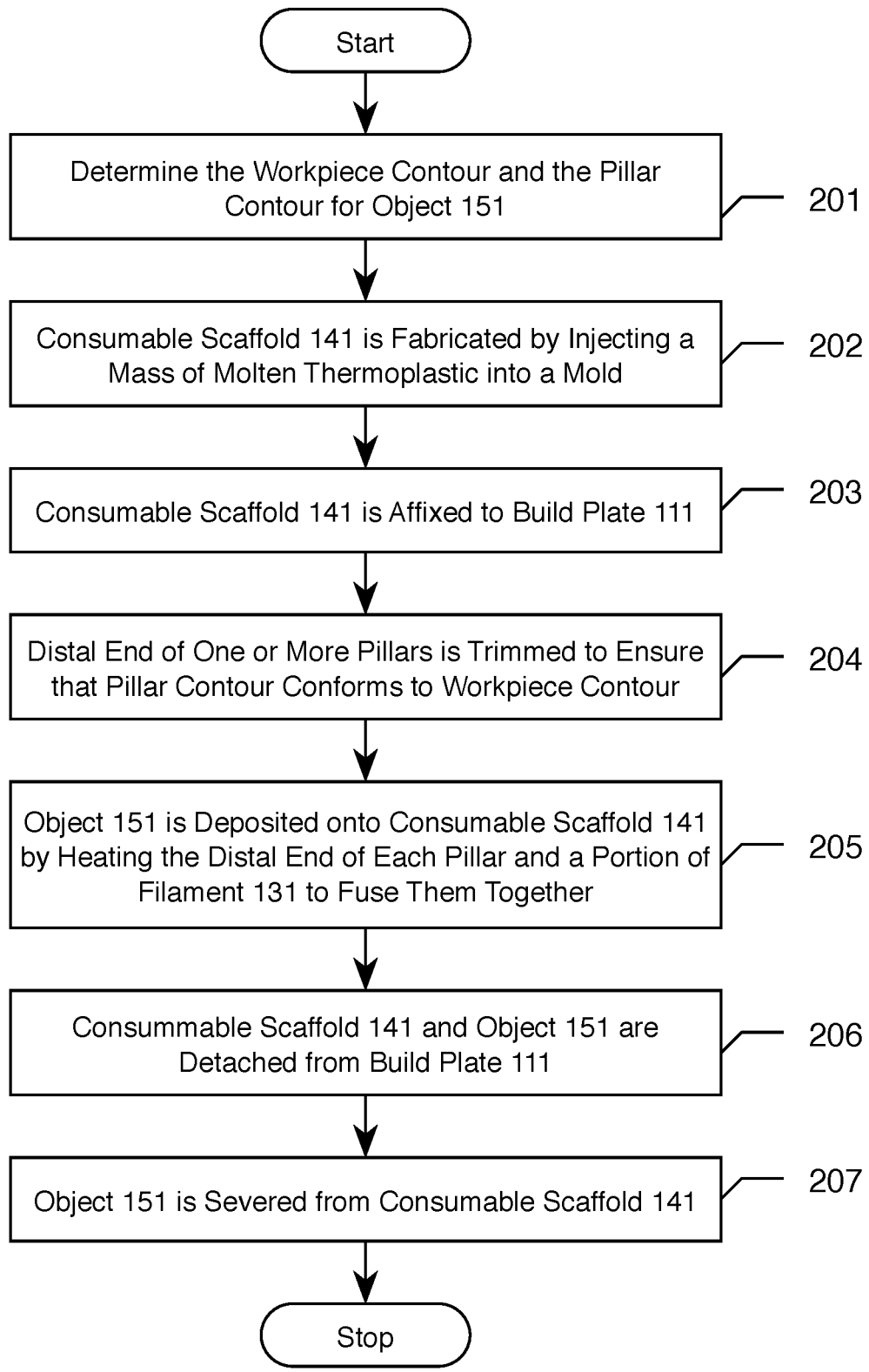
FIG. 2 depicts a flowchart of the salient steps performed by the illustrative embodiment of the present invention.

FIG. 2 depicts a flowchart of the salient steps associated with the operation of the illustrative embodiment of the present invention.

At step 201, a designer using a CAD system (not shown in the Figures) generates a mathematical model of the geometry and dimensions of object 151. It is well known to those skilled in the art how to use a CAD system, such as but not limited to Dassault Systèmes' SolidWorks®, to generate a mathematical model of an object.

As part of step 201, the designer uses the CAD system to decide how object 151 is to be supported by consumable scaffold 141 in all of its nascent and evolving stages. In particular, this requires the designer to decide:

(1) the angular orientation of object 151 with respect to consumable scaffold 141 during fabrication (i.e., what exterior portion of object 151 will be the underside during manufacture, and, therefore, resting on and in contact with the pillars of consumable report 141), and
(2) the contour of that part of object 151 that rests on the pillars of consumable scaffold 141, which is called the "workpiece contour", and
(3) the exact length to which each of pillars 302-1-1, . . . , 302-*i-j*, . . . , 302-10-10 must be trimmed—which is called the post-trimming "pillar contour"—that enables object 151 to rest perfectly on consumable report 141 without any gaps between object 151 and any pillar supporting it.

It will be clear to those skilled in the art, after reading this disclosure, how to determine the workpiece contour and the post-trimming pillar contour for any consumable scaffold and any object to be manufactured.

At step 202, consumable scaffold 141 is fabricated. In accordance with the illustrative embodiment, consumable scaffold 141 is fabricated with injection molding in well-known fashion (i.e., a mass of molten thermoplastic is injected at high pressure into a mold). In accordance with the illustrative embodiment, a large number of identical consumable scaffolds are fabricated through injection molding—which is an efficient and relatively inexpensive process—and then each consumable scaffold is modified in step 204 to conform to the workpiece contour determined in step 201. The details of consumable scaffold 141 are described below and in the accompanying figures.

Furthermore, it will be clear to those skilled in the art how to fabricate consumable scaffold 141 using other fabrication techniques including, but not limited to, additive manufacturing techniques such as fused-deposition modeling. The advantage of using additive manufacturing techniques to fabricate consumable scaffold 141 is that consumable scaffold 141 can be fully customized, ab initio, to conform to the workpiece contour, which avoids the need for trimming in step 204. The disadvantages of using additive manufacturing techniques to fabricate consumable scaffold 141 is that such techniques tend to be more expensive than injection molding.

Figure 3A:
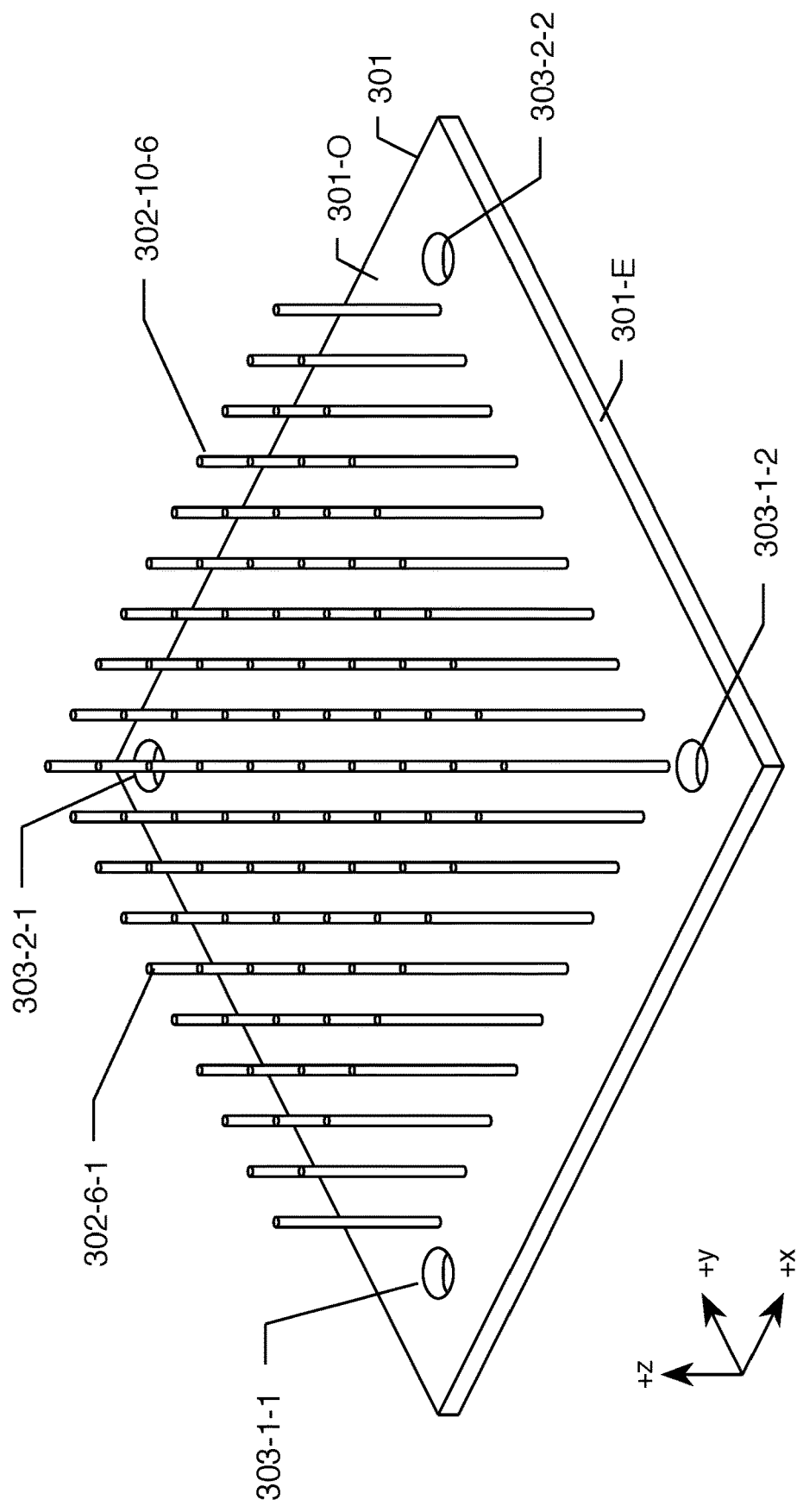
FIG. 3a depicts an isometric view of the salient features of consumable scaffold 141 in accordance with the illustrative embodiment of the present invention.
Figure 3B:
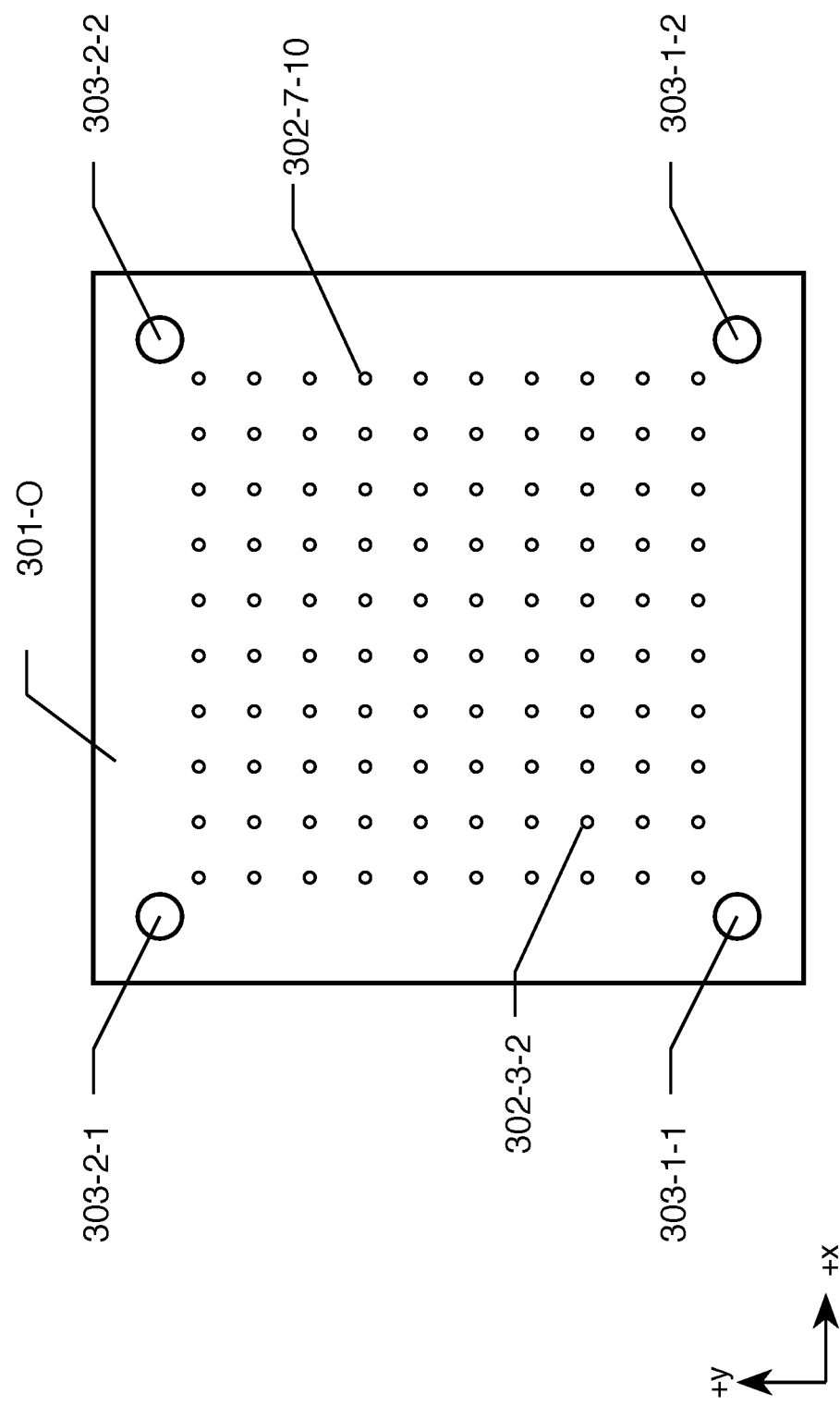
FIG. 3b depicts an orthographic top (i.e., plan) view of consumable scaffold 141.

At step 203, consumable scaffold 141 is mechanically affixed to build plate 111 with bolts through apertures 303-1-1, 303-1-2, 303-2-1, and 303-2-2 (as shown in FIGS. 1, 3a, and 3b). It will be clear to those skilled in the art, after reading this disclosure, how to make and use alternative embodiments of the present invention in which consumable scaffold 141 is mechanically affixed to build plate 111 with another means (e.g., clamps, vacuum, etc.). The purpose of mechanically affixing consumable scaffold 141 to build plate 111 is to ensure that consumable scaffold 141 does not move while object 151 is manufactured on consumable scaffold 141.

At step 204, the distal end of one or more pillars of consumable scaffold 141 are trimmed using cylindrical sharpener 123 to ensure that the "pillar contour" of consumable scaffold 141 conforms to the workpiece contour of object 151. It will be clear to those skilled in the art, after reading this disclosure, how to enable 3D printer 100 to perform step 203.

At step 205, deposition head 122 deposits thermoplastic filament 131 on consumable scaffold 141 to manufacture object 151. In particular, this requires that segments of filament 131 be fused onto consumable scaffold 141 to provide the support for other segments of filament 131. For example, the distal end of a first pillar is heated along with a first portion of a segment of filament 131, they are pressed together and become fused. The distal end of a second pillar is heated along with a second portion of the segment of filament 131, they are pressed together and become fused. The distal end of a third pillar is heated along with a third portion of the segment of filament 131, they are pressed together and become fused. Because the post-trimmed pillar contour conforms to the workpiece contour, the sections of filament acquire the workpiece contour. It will be clear to those skilled in the art, after reading this disclosure, how to enable 3D printer to achieve step 205.

At step 206, consumable scaffold 141 and object 151, which are fused together at the distal ends of pillars 302-1-1, . . . , 302-*i-j*, . . . , 302-10-10, are removed from build plate 111 by unbolting the bolts through apertures 303-1-1, 303-1-2, 303-2-1, and 303-2-2. It will be clear to those skilled in the art, after reading this disclosure, how to perform step 206.

At step 207, consumable scaffold 141 is detached from object 151 by severing the distal end of each pillar from the segment of filament 131 to which it was fused in step 205. In accordance with the illustrative embodiment, this is done by hand or with a machine (other than 3D printer 100) with a reciprocating saw in well-known fashion. The carcass of consumable scaffold 141 is then discarded or recycled in well-known fashion.

Figure 3C:
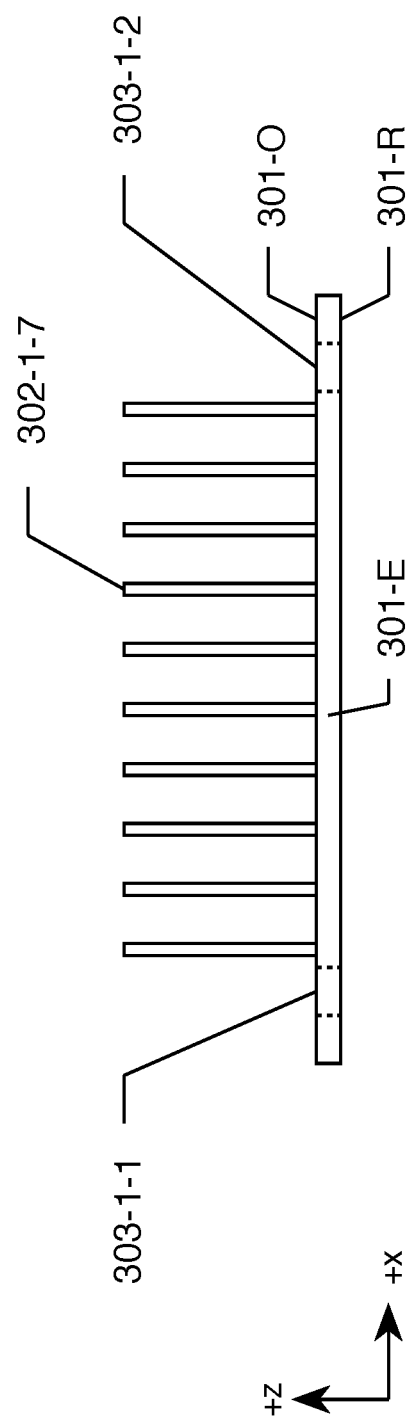
FIG. 3c depicts an orthographic front elevation view of consumable scaffold 141.
Figure 3D:
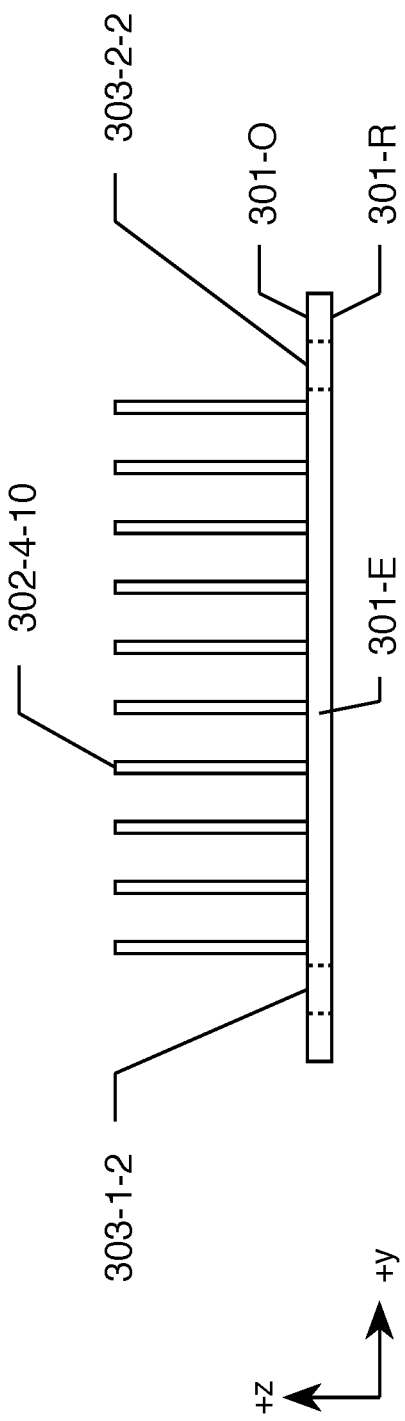
FIG. 3d depicts an orthographic side elevation view of consumable scaffold 141.

FIG. 3a depicts an isometric view of the salient features of consumable scaffold 141 in accordance with the illustrative embodiment of the present invention. FIG. 3b depicts an orthographic top (i.e., plan) view of consumable scaffold 141, FIG. 3c depicts an orthographic front elevation view of consumable scaffold 141, and FIG. 3d depicts an orthographic side elevation view of consumable scaffold 141.

Consumable scaffold 141 comprises: base sheet 301, a two-dimensional array of pillars 302-1-1, . . . , 302-*i-j*, . . . , 302-10-10, where i,j∈{1, 2, 3, . . . , 9, 10}, and a two-dimensional array of apertures 303-1-1, 303-1-2, 303-2-1, and 303-2-2, arranged as shown.

In accordance with the illustrative embodiment, consumable scaffold 141 is made of the same thermoplastic resin as thermoplastic filament 131, but it will be clear to those skilled in the art, after reading this disclosure, how to make and use alternative embodiments of the present invention in which consumable scaffold 141 is made from another material so long as the material at the distal ends of the pillars readily adheres to thermoplastic filament 131.

In accordance with the illustrative embodiment, consumable scaffold 141 is a homogeneous article of manufacture that is fabricated by injection molding in well-known fashion. It will be clear to those skilled in the art, after reading this disclosure, how to make and use alternative embodiments of the present invention in which consumable scaffold 141 is fabricated with another technique such as—for example and without limitation—3D printing.

Consumable scaffold 141 comprises 100 pillars, which are arranged in a two-dimensional array of ten rows and ten columns on 25 mm. centers. It will be clear to those skilled in the art, after reading this disclosure, how to make and use alternative embodiments of the present invention in which the consumable scaffold comprises any plurality of pillars (e.g., two pillars, three pillars, four pillars, five pillars, pillars, eight pillars, ten pillars, twelve pillars, sixteen pillars, twenty-five pillars, 144 pillars, 200 pillars, 320 pillars, 360 pillars, 1000 pillars, etc.). Furthermore, it will be clear to those skilled in the art, after reading this disclosure, how to make and use alternative embodiments of the present invention in which the pillars are arranged in any regular or irregular pattern (e.g., multiple radii, concentric circles, etc.).

Each of pillars 302-1-1, . . . , 302-*i-j*, . . . , 302-10-10 is elongate and comprises a proximate end and a distal end. The proximate end of each of pillars 302-1-1, . . . , 302-*i-j*, . . . , 302-10-10 is attached to and cantilevered from—the obverse side—obverse side 301-O—of base sheet 301.

Figure 4A:
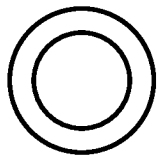
FIG. 4a depicts an orthographic top view of the distal end of a cylindrical pillar before trimming.
Figure 5A:
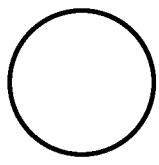
FIG. 5a depicts an orthographic top view of the distal end of a cylindrical pillar after trimming, which forms a distal end that is a frustum of a cone.
Figure 4B:
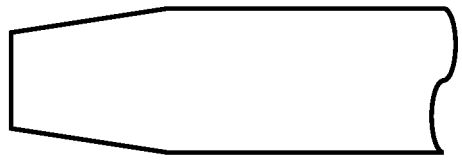
FIG. 4b depicts an orthographic front view of the distal end of a cylindrical pillar before trimming.
Figure 5B:
FIG. 5b depicts an orthographic front view of the distal end of a cylindrical pillar after trimming, which forms a distal end that is a frustum of a cone.
Figure 7A:
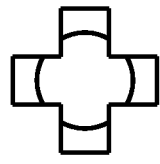
FIG. 7a depicts an orthographic top view of the distal end of a cruciate pillar after trimming, which forms a distal end that is a frustum of a conic cruciate.
Figure 7B:
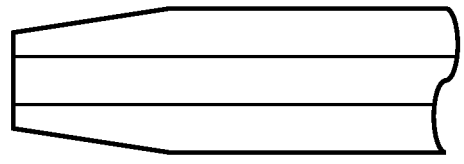
FIG. 7b depicts an orthographic front view of the distal end of a cruciate pillar after trimming, which forms a distal end that is a frustum of a conic cruciate.
Figure 6A:
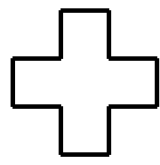
FIG. 6a depicts an orthographic top view of the distal end of a cruciate pillar before trimming.
Figure 6B:
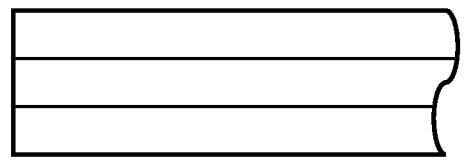
FIG. 6b depicts an orthographic front view of the distal end of a cruciate pillar before trimming.
Figure 8A:
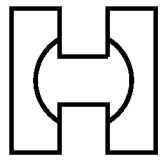
FIG. 8a depicts an orthographic top view of the distal end of an I-beam pillar before trimming.
Figure 8B:
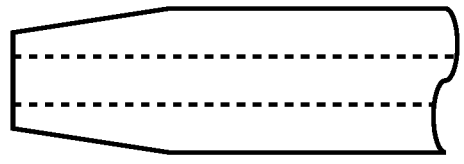
FIG. 8b depicts an orthographic front view of the distal end of an I-beam pillar before trimming.
Figure 9A:
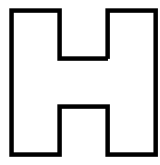
FIG. 9a depicts an orthographic top view of the distal end of an I-beam pillar after trimming, which forms a distal end that is a frustum of a conic I-beam.
Figure 9B:
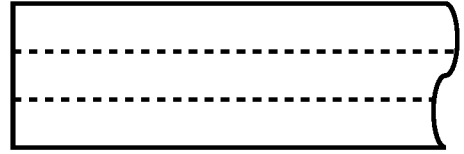
FIG. 9b depicts an orthographic front view of the distal end of an I-beam pillar after trimming, which forms a distal end that is a frustum of a conic I-beam.

Each of pillar 302-*i-j* is cylindrical in shape (i.e., has a round profile)—as depicted in FIGS. 4*a* and 4*b*. It will be clear to those skilled in the art, however, how to make and use alternative embodiments of the present invention in which one or more pillars are a different shape (e.g., cruciate pillars as depicted in FIGS. 6*a* and 6*b*, "I-beam" pillars as depicted in FIGS. 8*a* and 8*b*, etc.). After pillar 302-*i-j* is trimmed in step 204, the distal end of pillar 302-*i-j* acquires the shape of the frustum of a cone, as depicted in FIGS. 5*a* and 5*b*. Analogously, when a consumable scaffold comprises one or more cruciate pillars, the step of trimming creates a distal end with the shape of the frustum of a conic cruciate, as depicted in FIGS. 7*a* and 7*b*. Similarly, when a consumable scaffold comprises one or more I-beam pillars, the step of trimming creates a distal end with the shape of the frustum of a conic I-beam, as depicted in FIGS. 9*a* and 9*b*.

Each of pillars 302-1-1, . . . , 302-*i-j*, . . . , 302-10-10 is 80 mm. in length and 5 mm. in diameter, but it will be clear to those skilled in the art, after reading this disclosure, how to make and use alternative embodiments of the present invention in which each pillar is any length and any diameter, subject to the mechanical properties of the material from which it is made and its desired resistance to bending in step 205 (i.e., when filament 131 is fused to the distal end of pillar 302-*i-j* and tension on filament 131 tends to bend pillar 302-*i-j*.

In accordance with the illustrative embodiment, each of pillars 302-1-1, . . . , 302-*i-j*, . . . , 302-10-10 is the same length, but it will be clear to those skilled in the art, after reading this disclosure, how to make and use alternative embodiments of the present invention in which one or more pillars has a different length than one or more other pillars.

The distal ends of pillars 302-1-1, . . . , 302-*i-j*, . . . , 302-10-10 defines 100 geometric points in 3D space. This collection of geometric points is called the "pillar contour." Before any of the pillars 302-1-1, . . . , 302-*i-j*, . . . , 302-10-10 are trimmed in step 204, the pillar contour is planar (i.e., all of the distal ends lie in a plane). It will be clear to those skilled in the art, however, after reading this disclosure, how to make and use alternative embodiments of the present invention in which the distal ends of the pillars—before and after trimming—define any pillar contour.

Figure 10A:
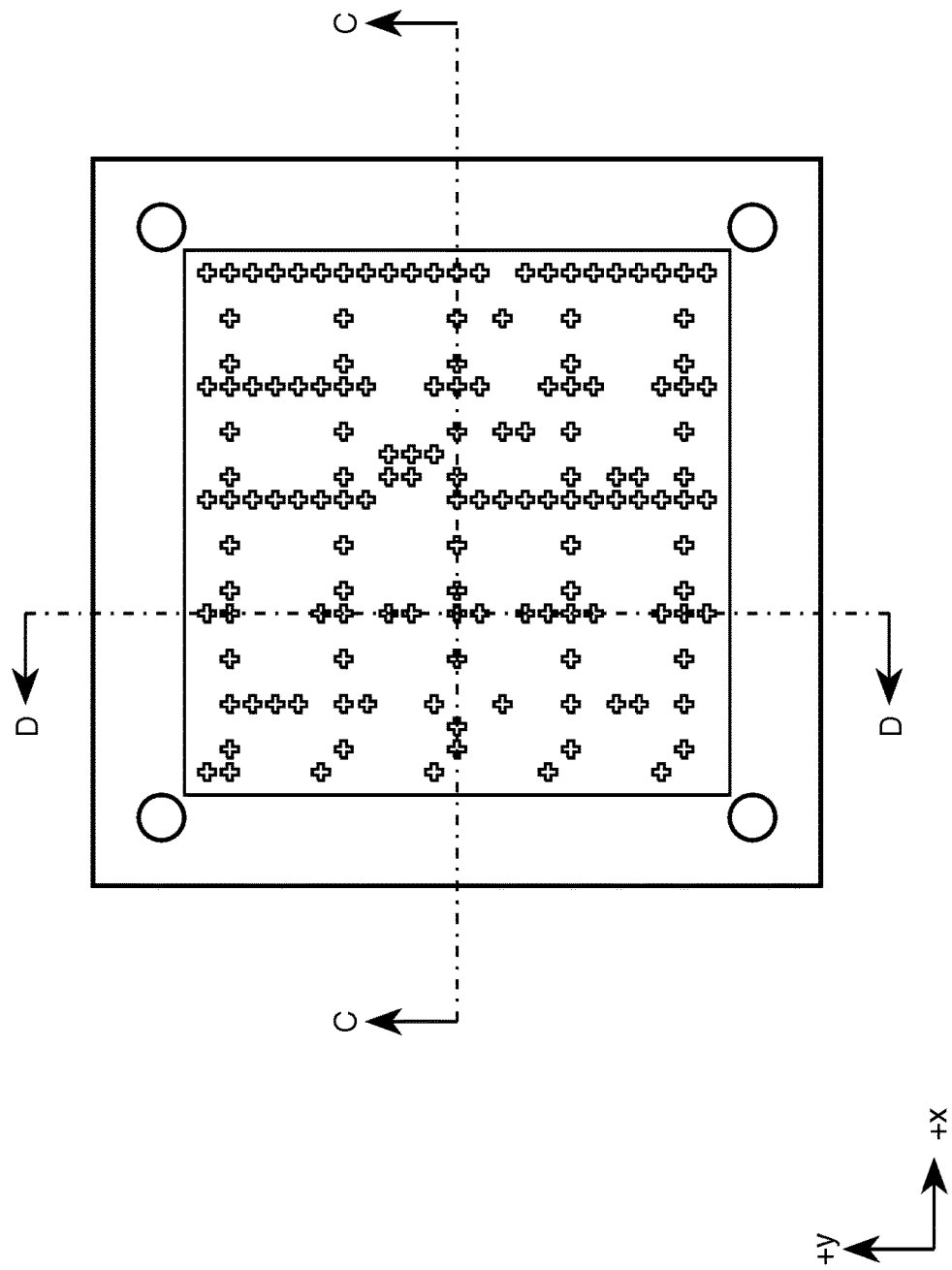
FIG. 10a depicts an orthographic top view of consumable scaffold 1000, which comprises a sparse array of cruciate pillars.
Figure 10B:
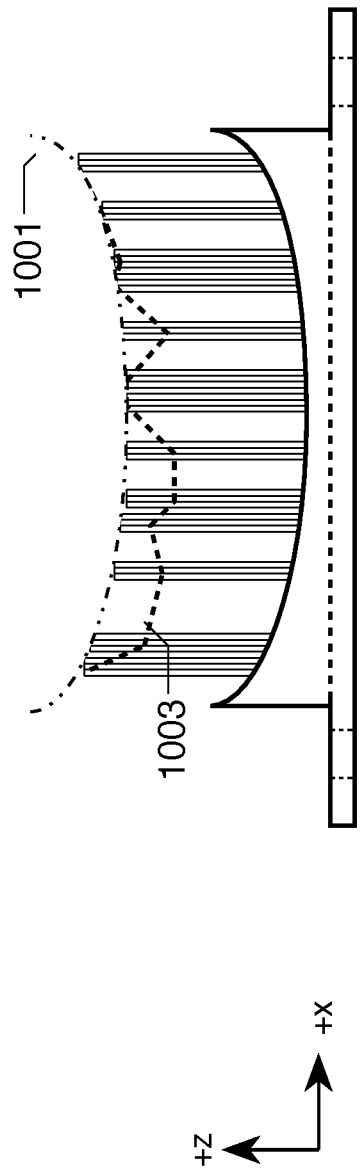
FIG. 10b depicts an orthographic front view of consumable scaffold 1000 at cross-section C-C, which depicts a concave obverse side and a concave pre-trimming pillar contour.
Figure 10C:
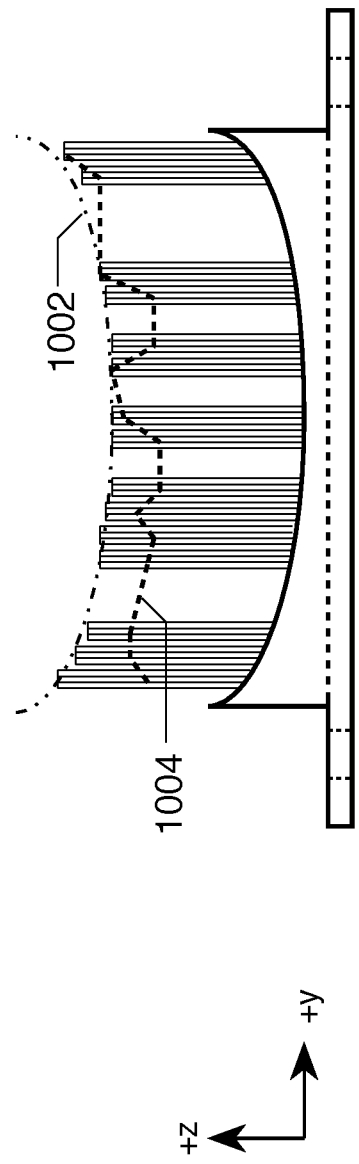
FIG. 10c depicts an orthographic side view of consumable scaffold 1000 at cross-section D-D, which depicts a concave obverse side and a concave pre-trimming pillar contour.
Figure 10D:
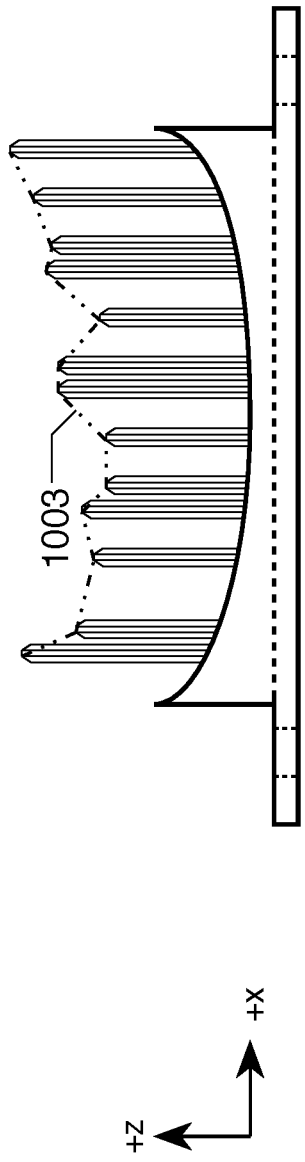
FIG. 10d depicts an orthographic front view of consumable scaffold 1000 at cross-section C-C, which depicts a concave obverse side and a post-trimming pillar contour that conforms to workpiece contour 1003.

For example, FIG. 10*a* depicts an orthographic top (i.e., plan) view of consumable scaffold 1000 in accordance with an alternative embodiment of the present invention that comprises a sparse two-dimensional array of cruciate pillars. FIG. 10*b* depicts an orthographic front elevation view of consumable scaffold 1000 at cross-section C-C before trimming, and FIG. 10*c* depicts an orthographic side elevation view of consumable scaffold 1000 at cross-section D-D before trimming. In FIG. 10*b*, the pre-trimming pillar contour 1001 is concave and is juxtaposed with the workpiece contour 1003. Workpiece contour 1003 is the guide for trimming the pillars into the post-trimming pillar contour. In FIG. 10*c*, the pre-trimming pillar contour 1002 is concave and is juxtaposed with the workpiece contour 1004. Workpiece contour 1004 is the guide for trimming the pillars into the post-trimming pillar contour. FIG. 10*d* depicts an orthographic front elevation view of consumable scaffold 1000 at cross-section C-C with post-trimming pillar contour 1003, which is irregular in shape. FIG. 10*e* depicts an orthographic side elevation view of consumable scaffold 1000 at cross-section D-D with post-trimming pillar contour 1004, which is irregular in shape. FIG. 10*f* depicts an orthographic front elevation view of consumable scaffold 1000 at cross-section C-C with filament fused to the distal ends of the post-trimming pillars in accordance with the post-trimming pillar contour 1003.

Figure 11A:
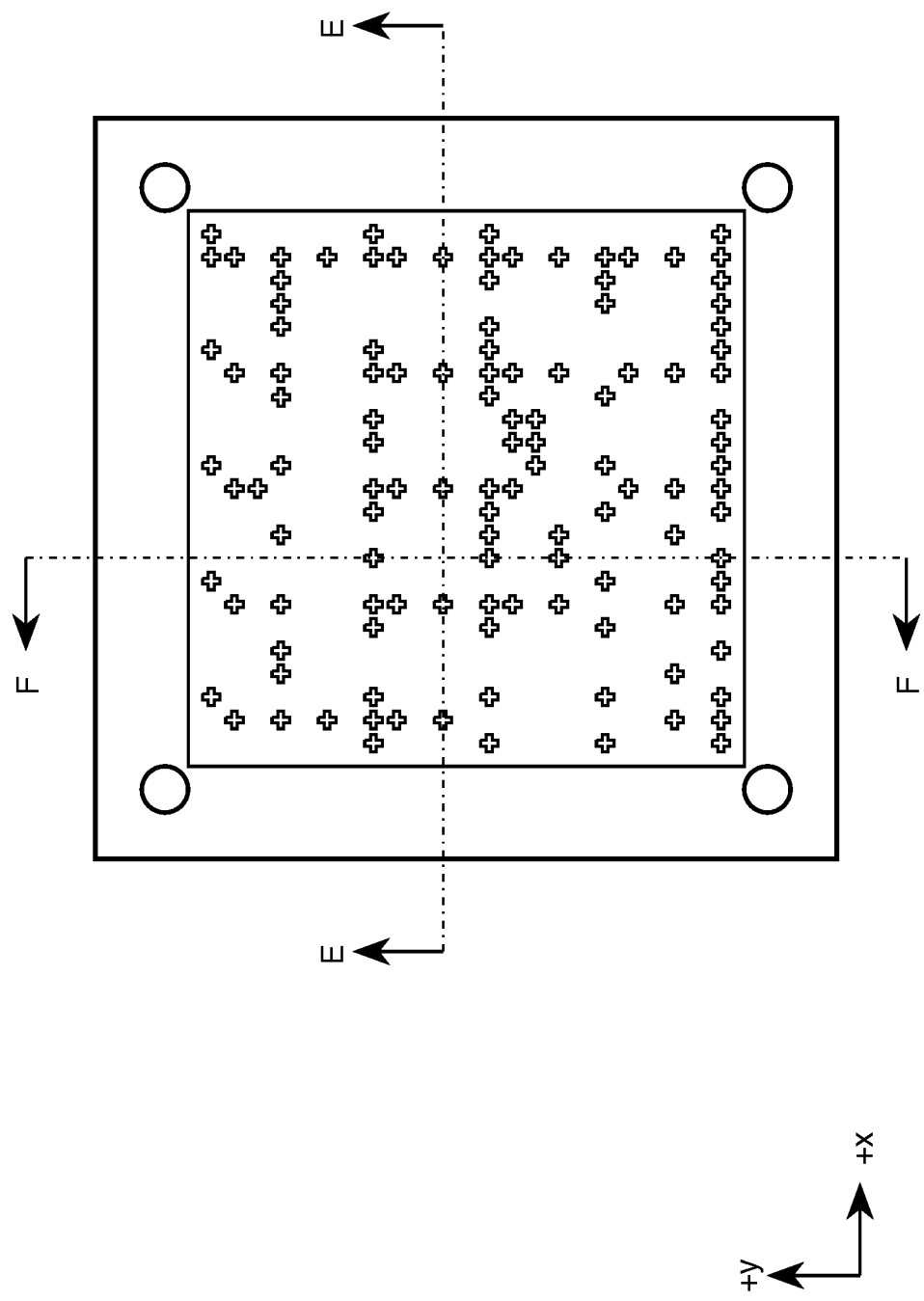
FIG. 11a depicts an orthographic top view of consumable scaffold 1100, which comprises a sparse array of cruciate pillars.
Figure 11B:
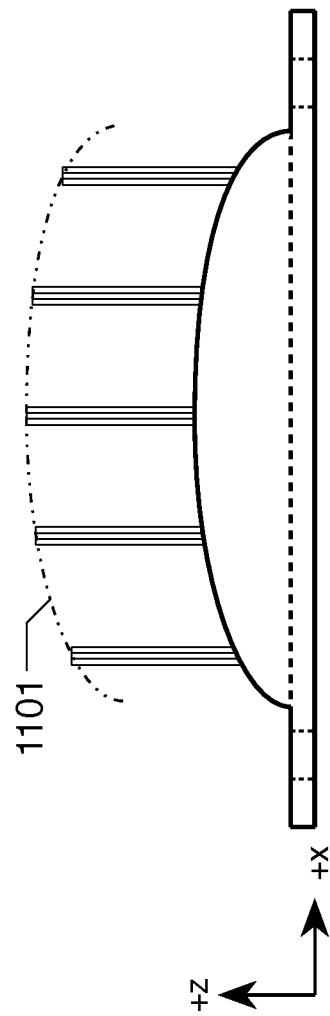
FIG. 11b depicts an orthographic front view of consumable scaffold 1000 at cross-section E-E, which depicts a convex obverse side and a convex pre-trimming pillar contour.
Figure 11D:
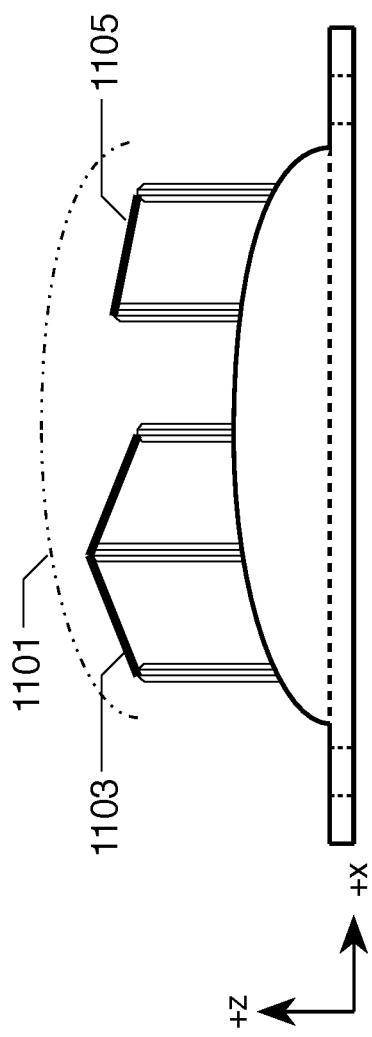
FIG. 11d depicts an orthographic front view of consumable scaffold 1100 at cross-section E-E, which depicts filaments 1003 and 1005, which have been fused to the distal ends of the post-trimmed pillars.

As another example, FIG. 11*a* depicts an orthographic top (i.e., plan) view of consumable scaffold 1100 in accordance with an alternative embodiment of the present invention that comprises a sparse two-dimensional array of cruciate pillars. FIG. 11*b* depicts an orthographic front elevation view of consumable scaffold 1100 at cross-section E-E before trimming, and FIG. 11*c* depicts an orthographic side elevation view of consumable scaffold 1100 at cross-section E-E before trimming. In FIG. 11*b*, the pre-trimming pillar contour 1101 is convex and in FIG. 11*c*, the pre-trimming pillar contour 1102 is planar. FIG. 11*d* depicts an orthographic front elevation view of consumable scaffold 1100 at cross-section E-E after trimming to conform with a workpiece contour that is not explicitly depicted in FIG. 11*d* but can be inferred from the location of filaments 1103 and 1105, which are fused to the distal ends of the trimmed pillars. In FIG. 11*d*, the post-trimming pillar contour 1103 is irregular (as evinced by fused filament 1103, which is fused to the distal ends of the pillars). FIG. 11*e* depicts an orthographic side elevation view of consumable scaffold 1100 at cross-section F-F after trimming to conform with a workpiece contour that is not explicitly depicted in FIG. 11*e* but can be inferred from the location of filament 1104, which is fused to the distal ends of the trimmed pillars.

Referring to FIGS. 3*a*, 3*b*, 3*c*, and 3*d*, base sheet 301 comprises obverse side 301-O, reverse side 301-R, and edge 301-E. In accordance with the illustrative embodiment, obverse side 301-O is 320 mm. by 320 mm., reverse side 301-R is 320 mm. by 320 mm., and edge 301-E is 10 mm. thick. It will be clear to those skilled in the art, however, after reading this disclosure, how to make and use alternative embodiments of the present invention in which the base sheet has any shape and any dimensions necessary or desirable to support the pillars.

Obverse side 301-O and reverse side 301-R are each characterized by a contour (i.e., a continuous or non-continuous surface in three-dimensions). In accordance with the illustrative embodiment, obverse side 301-O is characterized by a planar contour and reverse side 301-R is characterized by a planar contour.

It will be clear to those skilled in the art, however, after reading this disclosure, how to make and use alternative embodiments of the present invention in which at least a portion of the obverse side is characterized by a cross-section with a first contour (e.g., a concave contour, a convex contour, irregular, etc.). Furthermore, it will be clear to those skilled in the art, however, after reading this disclosure, how to make and use alternative embodiments of the present invention in which at least a portion of the obverse side is characterized by a second contour (e.g., a concave contour, a convex contour, irregular, etc.).

Definitions

For the purposes of this specification, the term "filament" is defined as a slender threadlike object of thermoplastic that might or might not comprise a non-thermoplastic reinforcing material (e.g., a fiber, metal, etc.). It should be noted that there is no particular length associated with the term "filament."

It is to be understood that the disclosure describes a few embodiments and that many variations of the invention can easily be devised by those skilled in the art after reading this disclosure and that the scope of the present invention is to be determined by the following claims.

What is claimed is:

1. A method comprising:
    fabricating a consumable scaffold that comprises:
        (i) a base sheet that comprises an obverse side and a reverse side, and
        (ii) a first pillar that is cantilevered from the obverse side of the base sheet, wherein the first pillar comprises a proximal end at the obverse side of the base sheet and a distal end, and
        (iii) a second pillar that is cantilevered from the obverse side of the base sheet, wherein the second pillar comprises a proximal end at the obverse side of the base sheet and a distal end, and
        (iv) a third pillar that is cantilevered from the obverse side of the base sheet, wherein the third pillar comprises a proximal end at the obverse side of the base sheet and a distal end;
    trimming the distal end of the first pillar and the distal end of the second pillar by different amounts with respect to each other, resulting in a trimmed distal end of the first pillar and a trimmed distal end of the second pillar, respectively, and to make the trimmed distal end of the first pillar, the trimmed distal end of the second pillar, and the distal end of the third pillar not collinear;
    heating the trimmed distal end of the first pillar and a first part of a fiber-reinforced thermoplastic filament and fusing the first part of the fiber-reinforced thermoplastic filament to the trimmed distal end of the first pillar when the trimmed distal end of the first pillar is heated;
    heating the trimmed distal end of the second pillar and a second part of the fiber-reinforced thermoplastic filament and fusing the second part of the fiber-reinforced thermoplastic filament to the trimmed distal end of the second pillar when the trimmed distal end of the second pillar is heated; and
    heating the distal end of the third pillar and a third part of the fiber-reinforced thermoplastic filament and fusing the third part of the fiber-reinforced thermoplastic filament to the distal end of the third pillar when the distal end of the third pillar is heated;
    wherein the fiber-reinforced thermoplastic filament, when fused to the first and second pillars, spans a separation between the first and second pillars that is greater than the width of the second pillar and that is devoid of any pillars.

2. The method of claim 1 further comprising:
    severing the trimmed distal end of the first pillar from the first part of the fiber-reinforced thermoplastic filament; and
    severing the trimmed distal end of the second pillar from the second part of the fiber-reinforced thermoplastic filament.

3. The method of claim 1 wherein the first pillar is a cylindrical pillar and the step of trimming comprises trimming the distal end of the first pillar to form a frustum of a cone.

4. The method of claim 1 wherein the first pillar is a cruciate pillar and the step of trimming comprises trimming the distal end of the first pillar to form a frustum of a conic cruciate.

5. The method of claim 1 wherein the first pillar is an I-beam pillar and the step of trimming comprises trimming the distal end of the first pillar to form a frustum of a conic I-beam.

6. The method of claim 1 wherein at least a portion of the obverse side of the base sheet is characterized by a cross-section with a first contour; and
    wherein a cross-section of the first contour is convex.

7. The method of claim 1 wherein at least a portion of the obverse side of the base sheet is characterized by a cross-section with a first contour; and
    wherein a cross-section of the first contour is concave.

8. The method of claim 1 wherein the consumable scaffold is fabricated from molten thermoplastic, the method further comprising mechanically affixing the consumable scaffold to a build plate of a 3D printer, and wherein the build plate comprises a material that is phobic to the molten thermoplastic.

9. The method of claim 8 wherein the material is polytetrafluoroethylene.

10. A method comprising:
    fabricating a consumable scaffold that comprises:
        (i) a base sheet that comprises an obverse side and a reverse side, and
        (ii) a first pillar that is cantilevered from the obverse side of the base sheet, wherein the first pillar comprises a proximal end at the obverse side of the base sheet and a distal end, and
        (iii) a second pillar that is cantilevered from the obverse side of the base sheet, wherein the second pillar comprises a proximal end at the obverse side of the base sheet and a distal end, and
        (iv) a third pillar that is cantilevered from the obverse side of the base sheet, wherein the third pillar comprises a proximal end at the obverse side of the base sheet and a distal end,
        wherein the distal end of the first pillar, the distal end of the second pillar, and the distal end of the third pillar are collinear;
    trimming the distal end of the first pillar, the distal end of the second pillar, and the distal end of the third pillar by different amounts with respect to one another, resulting in a trimmed distal end of the first pillar, a trimmed distal end of the second pillar, and a trimmed distal end of the third pillar, respectively;
    heating the trimmed distal end of the first pillar and a first part of a fiber-reinforced thermoplastic filament and fusing the first part of the fiber-reinforced thermoplastic filament to the trimmed distal end of the first pillar when the trimmed distal end of the first pillar is heated;
    heating the trimmed distal end of the second pillar and a second part of the fiber-reinforced thermoplastic filament and fusing the second part of the fiber-reinforced thermoplastic filament to the trimmed distal end of the second pillar when the trimmed distal end of the second pillar is heated; and
    heating the trimmed distal end of the third pillar and a third part of a fiber-reinforced thermoplastic filament and fusing the third part of the fiber-reinforced thermoplastic filament to the trimmed distal end of the third pillar when the trimmed distal end of the third pillar is heated;

wherein the fiber-reinforced thermoplastic filament, when fused to the first and second pillars, spans a separation between the first and second pillars that is greater than the width of the second pillar and that is devoid of any pillars.

11. The method of claim 10 further comprising:
severing the trimmed distal end of the first pillar from the first part of the fiber-reinforced thermoplastic filament;
severing the trimmed distal end of the second pillar from the second part of the fiber-reinforced thermoplastic filament; and
severing the trimmed distal end of the third pillar from the third part of the fiber-reinforced thermoplastic filament.

12. The method of claim 10 wherein the first pillar is a cylindrical pillar and the step of trimming comprises trimming the distal end of the first pillar to form a frustum of a cone.

13. The method of claim 10 wherein the first pillar is a cruciate pillar and the step of trimming comprises trimming the distal end of the first pillar to form a frustum of a conic cruciate.

14. The method of claim 10 wherein the first pillar is an I-beam pillar and the step of trimming comprises trimming the distal end of the first pillar to form a frustum of a conic I-beam.

15. The method of claim 10 wherein at least a portion of the obverse side of the base sheet is characterized by a cross-section with a first contour; and
wherein a cross-section of the first contour is convex.

16. The method of claim 10 wherein at least a portion of the obverse side of the base sheet is characterized by a cross-section with a first contour; and
wherein a cross-section of the first contour is concave.

17. The method of claim 10 wherein the consumable scaffold is fabricated from molten thermoplastic, the method further comprising mechanically affixing the consumable scaffold to the build plate of a 3D printer, and wherein the build plate comprises a material that is phobic to the molten thermoplastic.

18. The method of claim 17 wherein the material is polytetrafluoroethylene.

* * * * *